2,430,222

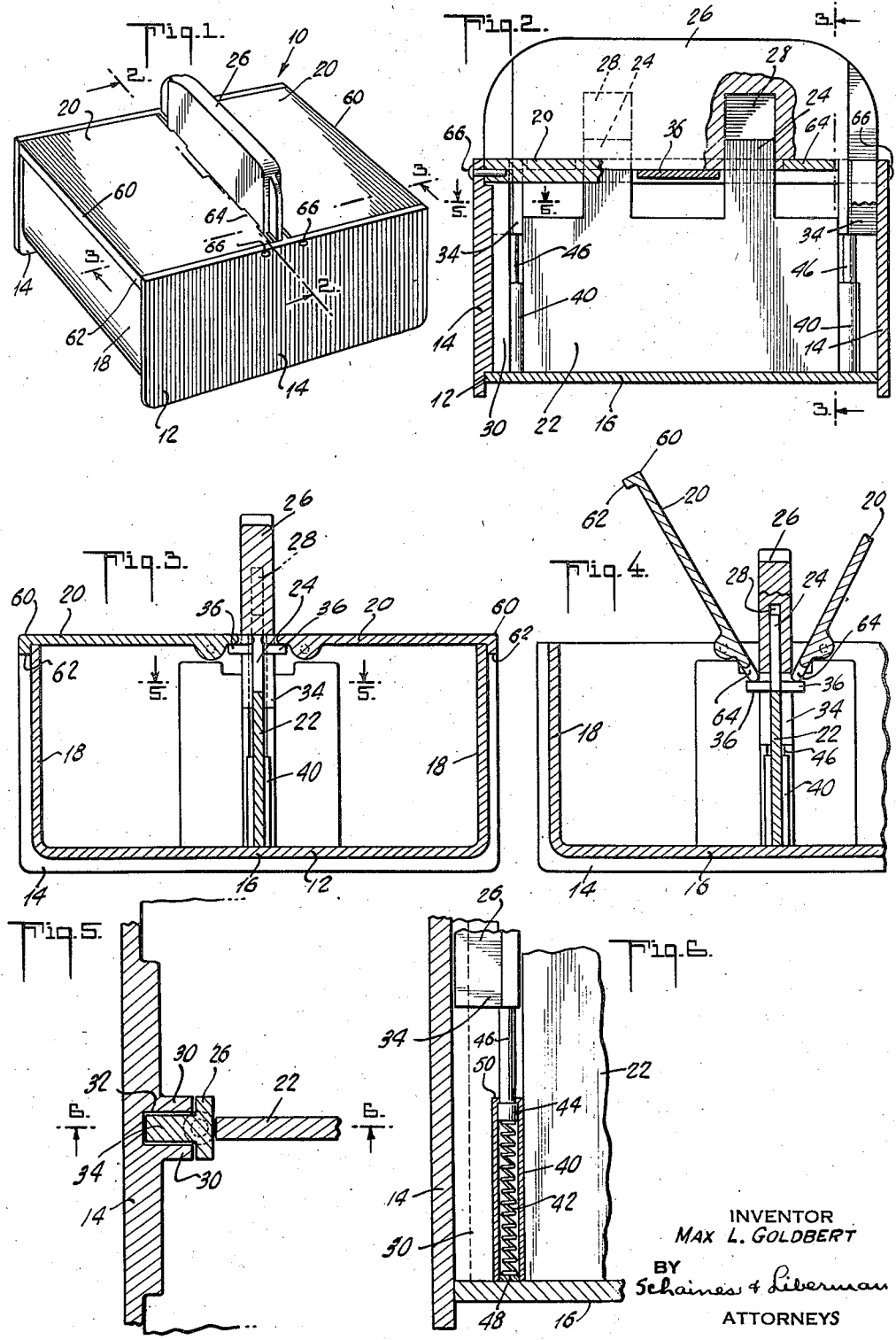
Nov. 4, 1947. M. L. GOLDBERT 2,430,222
OPERATOR FOR PIVOTED CLOSURES
Filed Jan. 10, 1945
INVENTOR
MAX L. GOLDBERT
BY
Schaines & Liberman
ATTORNEYS Patented Nov. 4, 1947

UNITED STATES PATENT OFFICE 2,430,222

OPERATOR FOR PIVOTED CLOSURES

Max L. Goldbert, New York, N. Y., assignor to Developers Corporation, Boston, Mass., a corporation of Massachusetts Application January 10, 1945, Serial No. 572,169

3 Claims. (Cl. 220—36)

My invention relates to containers, and in particular it relates to a container having means to raise the cover elements so as to permit access to the interior of the container, and means to automatically lower the covers onto the container.

The main object of my invention is the provision of an open-mouthed container, a cover therefor, and means to automatically raise and lower the cover.

Another object of my invention is the provision of an open-mouthed container having a plurality of compartments, a cover for each of said compartments, and means to automatically raise and lower the covers simultaneously.

Still another object of my invention is the provision of a container having a plurality of compartments, covers therefor, a dividing wall between said compartments, a plunger element vertically slidable in line with said dividing wall, and an engagement between the covers and the plunger element, whereby downward movement of the plunger will raise the covers to permit access to the interior of the compartments, and return movement of the plunger lowers the cover elements to close the container.

A further object of my invention is the provision of a container having a dividing septum therewithin defining a plurality of compartments, cover elements for each compartment pivoted on a horizontal axis adjacent the septum, a plunger vertically reciprocatable within the septum, an engagement between the plunger and the cover elements, means normally urging the septum upwardly to keep the container closed, downward movement of the plunger pivoting the cover elements upwardly, return movement of the plunger causing return of the cover elements onto the container.

Other and further objects of my invention will in part be pointed out specifically hereinbelow, and still others will be apparent from the following description of an illustrative embodiment thereof.

In the drawings annexed hereto, and forming a part hereof, wherein similar parts in the several figures will be indicated by the same numerals:

Figure 1 is a perspective view of one form of device constructed according to and embodying my invention;

Fig. 2 is a slightly enlarged part sectional, part elevational view, along the line 2—2 of Fig. 1 looking in the direction of the arrows;

Fig. 3 is a vertical section along the lines 3—3 of Figs. 1 and 2;

Fig. 4 is a view similar to Fig. 3, with the plunger element depressed and the cover elements pivoted upwardly;

Fig. 5 is an enlarged horizontal section on the lines 5—5 of Figs. 2 and 3; and

Fig. 6 is an enlarged view along the line 6—6 of Fig. 5.

My device generally, is indicated by reference numeral 10, and comprises a generally rectangular casing 12, having side walls 14, 14, bottom 16, end walls 18, 18, and cover elements 20, 20. The casing may be made of any suitable material, as wood, glass, metal, "lucite," or any of the plastics. It may be made in any desired size and shape, subject only to certain considerations which will be referred to hereinafter.

Centrally of my casing, and extending across the width thereof, I provide and secure a septum or wall 22, dividing the interior of the casing into two compartments. This septum 22 has a pair of fingers 24, 24, extending upwardly from the top thereof, in line therewith. As seen in Fig. 5, the ends of septum 22 do not quite extend to the side walls 14, 14, there being a space between the side walls and the ends of septum 22. A plunger member 26 is provided, extending across the width of the casing, having a pair of axially extending sockets 28, 28, opening downwardly, the sockets being so dimensioned and located as to receive fingers 24, 24, slidably therewithin. Side walls 14, 14, have spaced vertical ribs, as 30, 30, extending into the interior of the casing, defining opposing channels 32, 32. Ribs 30, 30, may be formed integrally with the side walls, or secured thereto. The ends of plunger 26 are reduced in thickness to fit into the channels 32, 32, and are provided with downwardly extending fingers 34, 34, at the underside thereof, fitting into channels 32, 32. Plunger 26 is provided, either integrally therewith, or secured thereonto, with a horizontally disposed outwardly extending rib or shelf 36, on each side thereof. In the position of plunger 26 as shown in Figs. 2 and 3, ribs or shelves 36, 36, are located slightly below the top of casing 12. A hollow tube 40, is disposed within the casing, on each side thereof adjacent channel 32, each tube having a normally expanding spring 42 disposed therewithin and bearing against cap 44 on the bottom of a piston element 46. Spring 42 and piston cap 44 may be locked within tube 40 between the bottom plate 48 (or, if desired, the casing bottom 16) and the bent over lips 50 at the top of each tube. Pistons 46, 46, bear against the underside of plunger fingers 34, 34, normally urging same upwardly as shown in Figs. 2 and 3.

Casing 12 is, as shown in this modification of my invention, rectangular, and the openings into the compartments formed by septum 22 dividing the interior of the casing, are similarly rectangular. The cover elements 20, 20 are, therefore, generally rectangular. The outer ends 60, 60, may be provided with downwardly shouldered flanges 62, 62, to overlap the edges of end walls 18, 18. The inner ends have a number of extending fingers 64, 64, of such length as to fit underneath the lower edge of plunger 26. Covers 20, 20, are pivotally secured on a horizontal axis to side walls 14, 14, as by pins 66, 66, adjacent plunger 26, extending into covers 20, 20, near the inner ends thereof.

My device may be assembled in the following manner, although not necessarily so. After casing 12 is formed, tubes 40, 40, and pistons 46, 46, are placed in position, and septum 22 inserted. Plunger 26 may then be threaded atop septum 22. Plunger 26 is then depressed sufficiently to permit covers 20, 20, to be inserted in the position of Figs. 2 and 3, with cover fingers 64, 64 resting atop shelves 36, 36, and underneath the bottom of plunger 26. Pins 66, 66, may then be inserted to lock all the parts together.

My device operates as follows: When it is desired to raise covers 20, 20, plunger 26 is depressed against the expanding tendency of springs 42, 42, bearing downwardly against cover fingers 64, 64, and causing the covers to pivot about pins 66, 66, into the position of Fig. 4. When pressure on the plunger is released, pistons 46, 46, bearing against the underside of fingers 34, 34, urge the fingers upwardly. Shelves 36, 36, bear against cover fingers 64, 64, and cause a pivoting of the covers downwardly into the position of Fig. 3.

If the casing is circular, or oval in shape, the cover elements must be shaped to fit the compartments. That is the only consideration limiting the shape of the covers.

My device is simple to operate and its construction requires no particular skill or ability. It functions easily to open and close merely by plunger pressure.

Having now described my invention, what I claim and desire to secure by Letters Patent is:

1. In a device of the character described, a casing, a vertically arranged wall member disposed within the casing dividing the interior thereof into a plurality of compartments, vertically arranged recesses extending axially of said wall member, a cover for each compartment, a plunger mounted on said wall member having fingers extending downwardly from the underside thereof extending into the interior of the casing, means within said vertically arranged recesses bearing against the underside of said fingers to normally urge the plunger upwardly and means on the cover to restrain the plunger against upward movement in response to the normal urging of the spring means.

2. A device as in claim 1, in which the plunger is provided with a horizontally disposed outwardly extended rib, and has recesses above said ribs, and the cover members are provided with inwardly extending fingers resting on said ribs and projecting into the recesses.

3. A device of the character described comprising a casing having bottom and side walls, a septum disposed transversely of the casing, said septum having fingers projecting upwardly thereof, a plunger element disposed atop the septum having recesses extending laterally thereof up from the bottom of the plunger, the septum fingers being recessed with the plunger recesses, a horizontally disposed rib on each side of the plunger projecting outwardly therefrom, a plurality of slots in the plunger extending in from the sides thereof, a pair of cover elements atop the casing walls and pivoted thereto, the cover elements having inwardly extending fingers being received within the plunger slots and held therewith for movement in response to movement of the plunger in a vertical line.

MAX L. GOLDBERT.

REFERENCES CITED

The following references are of record in the file of this patent:

UNITED STATES PATENTS

| Number | Name | Date |
|---|---|---|
| 1,535,908 | Dolan | Apr. 28, 1925 |
| 1,804,163 | Herold | May 5, 1931 |
| 2,316,979 | Shipley | Apr. 20, 1943 |

FOREIGN PATENTS

| Number | Country | Date |
|---|---|---|
| 167,943 | Great Britain | Aug. 25, 1921 |
| 234,378 | Great Britain | May 28, 1925 |